United States Patent
Liu (10) Patent No.: US 11,546,531 B2
(45) Date of Patent: Jan. 3, 2023

(54) CAMERA ASSEMBLY, IMAGE ACQUISITION METHOD, AND MOBILE TERMINAL

(71) Applicant: VIVO MOBILE COMMUNICATION CO., LTD., Guangdong (CN)

(72) Inventor: Yongguo Liu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 170 days.

(21) Appl. No.: 16/762,401

(22) PCT Filed: Nov. 8, 2018

(86) PCT No.: PCT/CN2018/114578
§ 371 (c)(1),
(2) Date: May 7, 2020

(87) PCT Pub. No.: WO2019/091426
PCT Pub. Date: May 16, 2019

(65) Prior Publication Data
US 2020/0351458 A1  Nov. 5, 2020

(30) Foreign Application Priority Data
Nov. 8, 2017  (CN) .......................... 201711091921.3

(51) Int. Cl.
*H04N 5/355*  (2011.01)
*G03B 33/16*  (2006.01)
*H04N 5/225*  (2006.01)
*H04N 5/232*  (2006.01)

(52) U.S. Cl.
CPC ......... *H04N 5/35563* (2013.01); *G03B 33/16* (2013.01); *H04N 5/2254* (2013.01); *H04N 5/2257* (2013.01); *H04N 5/23229* (2013.01)

(58) Field of Classification Search
None
See application file for complete search history.

(56) References Cited

U.S. PATENT DOCUMENTS 5,373,182 A    12/1994  Norton
10,554,874 B2 *  2/2020  Hirota ................ G02B 13/0085
(Continued)

FOREIGN PATENT DOCUMENTS

CN    101321295 A    12/2008
CN    101577287 A    11/2009
(Continued)

OTHER PUBLICATIONS

CN Search Report in Application No. 201711091921.3 dated Nov. 16, 2018.
(Continued)

*Primary Examiner* — Quan Pham
(74) *Attorney, Agent, or Firm* — Maschoff Brennan (57) ABSTRACT

A camera assembly, an image acquisition method, and a mobile terminal are provided. The image acquisition method is applied to a mobile terminal including the camera assembly provided in this disclosure, and the image acquisition method includes: acquiring first image data derived from an exposure of a filtering and photosensitive module in the camera assembly and second image data derived from an exposure of a photosensitive module in the camera assembly; generating a target image from the first image data and the second image data.

14 Claims, 6 Drawing Sheets

(56) References Cited

U.S. PATENT DOCUMENTS

| | | |
|---|---|---|
| 2007/0206241 A1 | 9/2007 | Smith et al. |
| 2008/0303919 A1 | 12/2008 | Egawa |
| 2009/0278048 A1 | 11/2009 | Choe et al. |
| 2010/0320368 A1 | 12/2010 | Koskinen et al. |
| 2014/0168444 A1 | 6/2014 | Bae et al. |
| 2015/0098006 A1 | 4/2015 | Oka |
| 2015/0138366 A1 | 5/2015 | Keelan et al. |
| 2015/0200220 A1 | 7/2015 | Juenger et al. |
| 2016/0050359 A1* | 2/2016 | Nakata .................. G03B 13/36 250/201.2 |
| 2017/0140221 A1 | 5/2017 | Ollila et al. |
| 2017/0353700 A1* | 12/2017 | Aruga ............... H01L 27/14621 |
| 2018/0063410 A1* | 3/2018 | Izumi ................ H04N 5/23258 |

FOREIGN PATENT DOCUMENTS

| | | |
|---|---|---|
| CN | 102460700 A | 5/2012 |
| CN | 104517982 A | 4/2015 |
| CN | 105635532 A | 6/2016 |
| CN | 106657726 A | 5/2017 |
| CN | 107846537 A | 3/2018 |
| WO | 2017/052766 A1 | 3/2017 |

OTHER PUBLICATIONS

Written Opinion and International Search Report in Application No. PCT/CN2018/114578 dated May 22, 2020.
European Search Report in Application No. 18875717.3 dated Oct. 30, 2020.

* cited by examiner

CAMERA ASSEMBLY, IMAGE ACQUISITION METHOD, AND MOBILE TERMINAL

CROSS-REFERENCE TO RELATED APPLICATION

This application is a U.S. national phase application of a PCT Application No. PCT/CN2018/114578 filed on Nov. 8, 2018, which claims a priority to Chinese patent application No. 201711091921.3 filed in China on Nov. 8, 2017, a disclosure of which is incorporated herein by reference in its entirety.

TECHNICAL FIELD

The present disclosure relates to the field of communication technologies, in particular to a camera assembly, an image acquisition method, and a mobile terminal.

BACKGROUND

At present, there are some common problems in the application of a single camera. First, an image of a low light scene has a low brightness, a large noise, and a poor detail. Since the ambient light passing through the lens has limited light energy per se, and further subjects to infrared filtering, color filtering, filtering of a coating film, and the like, the light energy actually arrives at a surface of a photosensitive module is very small Therefore, in a low light scene, the actual signal is greatly affected by noise, and it is difficult to reproduce the actual signal, thereby affecting the image quality.

Second, when a high-brightness scene or a high-contrast scene is photographed, it is difficult to render details of both a high-brightness portion and a low-brightness portion of a same image well in one exposure due to the limitation of the dynamic range of the photosensitive module. Although, a dual-camera or multi-camera scheme may set different operation modes according to requirements, thereby mitigating the problem caused by noise in the low light scene and the problem caused by limited dynamic range in the high-variance scene; however, the dual-camera or multi-camera scheme is limited by available space in the mobile device and hampers portability; additionally, implementing multiple cameras adds significant costs.

SUMMARY

In a first aspect, the present disclosure further provides, in some embodiments, an image acquisition method applied to a mobile terminal including a camera assembly, the image acquisition method including:

acquiring first image data derived from an exposure of a filtering and photosensitive module in the camera assembly and second image data derived from an exposure of a photosensitive module in the camera assembly;

generating a target image from the first image data and the second image data.

In a second aspect, the present disclosure further provides, in some embodiments, a mobile terminal, wherein the mobile terminal includes the camera assembly, and the mobile terminal further includes:

a first acquisition module, configured to acquire first image data derived from an exposure of the filtering and photosensitive module in the camera assembly and second image data derived from an exposure of the photosensitive module in the camera assembly;

a first processing module, configured to generate a target image from the first image data and the second image data.

In a third aspect, the present disclosure further provides, in some embodiments, a mobile terminal including a processor, a storage, and a computer program stored in the storage and configured to be executed by the processor, wherein the processor is configured to execute the computer program to implement steps of the image acquisition method described above.

In a fourth aspect, the present disclosure further provides, in some embodiments, a computer readable storage medium storing therein a computer program, wherein the computer program is configured to be executed by a processor to implement steps of the image acquisition method described above.

DETAILED DESCRIPTION

The technical solution in the embodiments of the present disclosure will be described more clearly and completely below with reference to the accompanying drawings in the embodiments of the present disclosure. It is apparent that the described embodiments are a part, but not all, of the embodiments of the present disclosure. Based on the embodiments in the present disclosure, all other embodiments obtained by a person of ordinary skill in the art without involving any creative effort are within the scope of the present disclosure.

The present disclosure provides in some embodiments a camera assembly, an image acquisition method, and a mobile terminal, to solve a problem in the related art that image quality is impacted by a poor light detection capability of a single camera.

To solve the above technical problem, the present disclosure provides a camera assembly including a photosensitive module, and the camera assembly further includes a filtering and photosensitive module. The photosensitive module is disposed at bottom of the camera assembly, and the filtering and photosensitive module is disposed in middle of the camera assembly.

The incident light transmitted into the camera assembly first passes through the filtering and photosensitive module and then through the photosensitive module.

Figure 1:
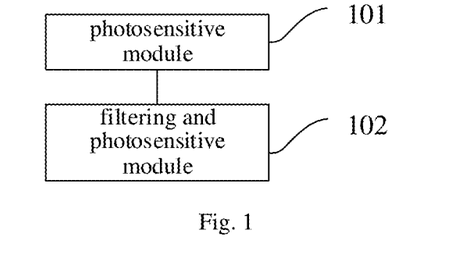
FIG. 1 is a schematic structural diagram of a camera assembly according to some embodiments of the present disclosure.

To solve the problem in the related art that image quality is impacted by a poor light detection capability of a single camera, the present disclosure provides a camera assembly. As shown in FIG. 1, the camera assembly includes a photosensitive module 101 and further includes a filtering and photosensitive module 102. The photosensitive module 101 is disposed at bottom of the camera assembly, and the filtering and photosensitive module 102 is disposed in middle of the camera assembly.

The incident light transmitted into the camera assembly first passes through the filtering and photosensitive module 102 and then through the photosensitive module 101.

The camera assembly provided in the embodiments of the present invention is capable of acquiring light energy passing through the camera lens sufficiently by means of the photosensitive module located at bottom of the camera assembly and the filtering and photosensitive module located in middle of the camera assembly, thereby providing a basis for solving the problem in the related art that image quality is impacted by a poor light detection capability of a single camera.

Optionally, the camera assembly further includes a microlens. The filtering and photosensitive module is disposed between the microlens and the photosensitive module; or, the microlens is disposed between the filtering and photosensitive module and the photosensitive module; or, the filtering and photosensitive module includes a first portion and a second portion, the microlens is disposed between the first portion and the second portion, and the second portion is disposed between the microlens and the photosensitive module.

Corresponding to different positions of the filtering and photosensitive module, the filtering and photosensitive module may have the following structures.

First, in case that the filtering and photosensitive module is disposed between the microlens and the photosensitive module, the filtering and photosensitive module includes a first photosensitive submodule and a color filtering module that are integrally formed.

This structure enables acquiring the light energy before the color filtering module filters the light, and provides support to improve the camera assembly's brightness reproduction accuracy of the target image.

Second, in case that the microlens is disposed between the filtering and photosensitive module and the photosensitive module, the filtering and photosensitive module includes a second photosensitive submodule and an infrared filter that are integrally formed.

This structure enables acquiring the light energy before the infrared filter filters the light, so that the camera assembly can more accurately reproduce the brightness of a target object.

Third, in case that the filtering and photosensitive module includes a first portion and a second portion, the first portion includes a third photosensitive submodule and an infrared filter that are integrally formed, and the second portion includes a fourth photosensitive submodule and a color filtering module that are integrally formed.

This structure is a combination of the above two structures, thereby further facilitating the camera assembly to accurately reproduce the brightness of the target object.

As can be seen from the above, the foregoing solutions in the embodiments of the present disclosure provide a basis for solving the problem in the related art that image quality is impacted by a poor light detection capability of a single camera.

Figure 2:
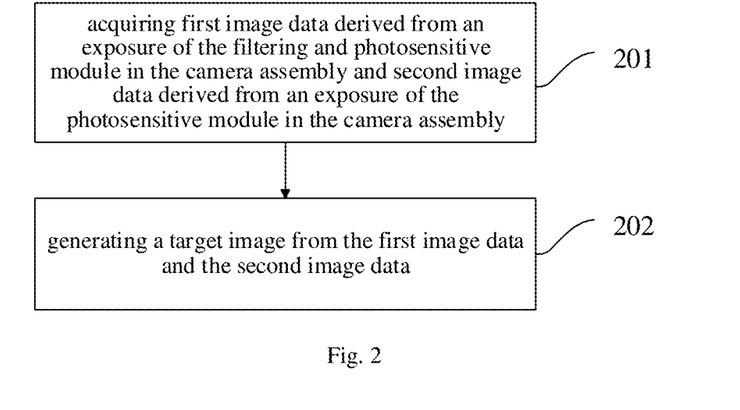
FIG. 2 is a schematic flowchart of an image acquisition method according to some embodiments of the present disclosure.
Figure 3:
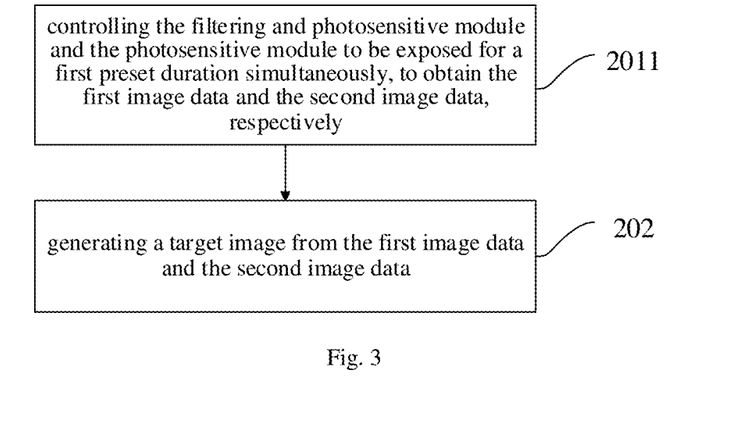
FIG. 3 is another schematic flowchart of an image acquisition method according to some embodiments of the present disclosure.

The present disclosure further provides, in some embodiments, an image acquisition method applied to a mobile terminal including the camera assembly described above. As shown in FIG. 2 and FIG. 3, the image acquisition method includes a step 201 and a step 202.

Step 201: acquiring first image data derived from an exposure of the filtering and photosensitive module in the camera assembly and second image data derived from an exposure of the photosensitive module in the camera assembly.

The incident light transmitted into the camera assembly first passes through the filtering and photosensitive module and then passes through the photosensitive module, and the light energy to which the filtering and photosensitive module is exposed is greater than the light energy to which the photosensitive module is exposed.

Step 202: generating a target image from the first image data and the second image data.

Primarily, more accurate luminance values are acquired based on the first image data and the second image data.

According to the image acquisition method provided in embodiments of the present disclosure, by using a camera assembly provided with a photosensitive module and a filtering and photosensitive module, first image data derived from an exposure of the filtering and photosensitive module in the camera assembly and second image data derived from an exposure of the photosensitive module in the camera assembly are acquired; and a target image is generated from the first image data and the second image data. As a result, the light energy transmitted through the camera lens can be fully utilized, and the problem in the related art that image quality is impacted by a poor light detection capability of a single camera is solved.

As shown in FIG. 3, the acquiring first image data derived from an exposure of the filtering and photosensitive module in the camera assembly and second image data derived from an exposure of the photosensitive module in the camera assembly includes a step 2011: controlling the filtering and photosensitive module and the photosensitive module to be exposed for a first preset duration simultaneously, to obtain the first image data and the second image data, respectively.

The purpose is to expose the filtering and photosensitive module and the photosensitive module simultaneously, so that data derived from exposures at the same time instant may be output separately, to improve the accuracy of the data and obtain a more accurate target image after processing.

Figure 4:
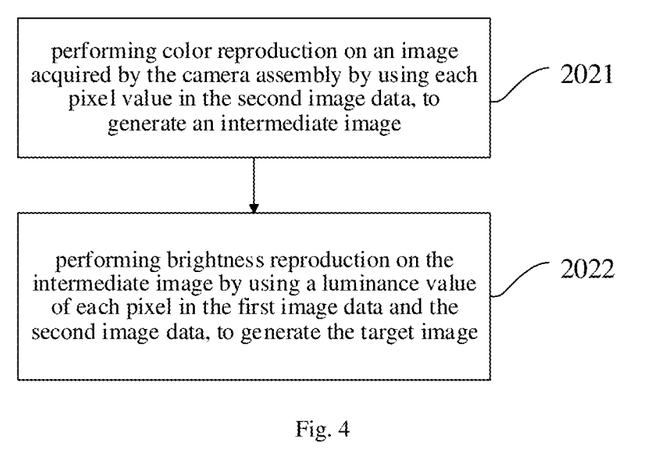
FIG. 4 is yet another schematic flowchart of an image acquisition method according to some embodiments of the present disclosure.
Figure 5:
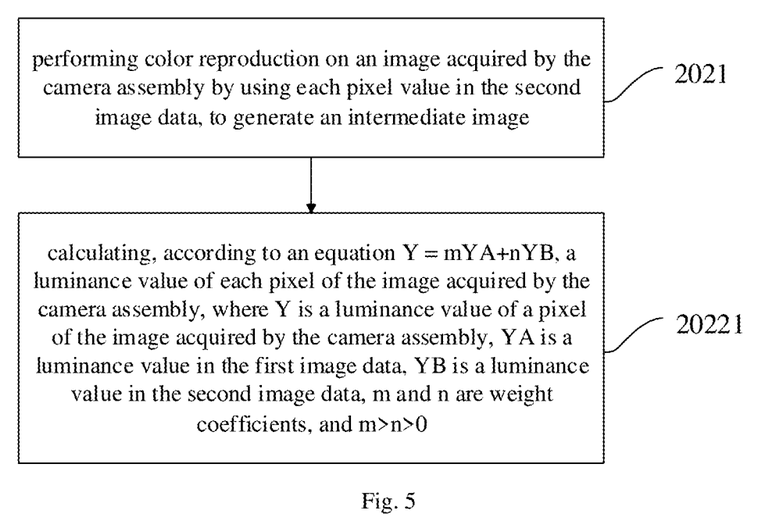
FIG. 5 is still another schematic flowchart of an image acquisition method according to some embodiments of the present disclosure.

As shown in FIG. 4 and FIG. 5, the generating a target image from the first image data and the second image data includes a step 2021 and a step 2022.

Step 2021: performing color reproduction on an image acquired by the camera assembly by using each pixel value in the second image data, to generate an intermediate image.

In this step, each pixel value in the second image data is used to perform color reproduction on the image acquired by the camera assembly to generate the intermediate image, so that colors of an acquired image are closer to the photographed scene.

Step 2022: performing brightness reproduction on the intermediate image by using a luminance value of each pixel in the first image data and the second image data, to generate the target image.

In this way, the utilization rate of light can be improved, and the noise effect can be reduced. The target image may be considered equivalent to the image acquired by the camera assembly.

As shown in FIG. 5, the performing brightness reproduction on the intermediate image by using a luminance value of each pixel in the first image data and the second image data includes a step 20221: calculating, according to an equation $Y=mYA+nYB$, a luminance value of each pixel of the image acquired by the camera assembly, where Y is a luminance value of a pixel of the image acquired by the camera assembly, YA is a luminance value in the first image data, YB is a luminance value in the second image data, m and n are weight coefficients, and $m>n>0$.

Specifically, $Y=aYA1+bYA2+cYB$, where Y is luminance information of image after the brightness reproduction, YA1 is luminance information of image data derived from an exposure of the filtering and photosensitive module with the color filtering module, YA2 is luminance information of image data derived from an exposure of the filtering and photosensitive module with the infrared filter, and YB is luminance information of the second image data.

In case that the filtering and photosensitive module is integrated with the color filtering module (the filtering and photosensitive module includes a first photosensitive submodule and a color filtering module that are integrally formed), a is determined according to light energy distribution information and color components absorbed by the filtering and photosensitive module, b=0, c=1.

In case that the filtering and photosensitive module is integrated with the infrared filter (the filtering and photosensitive module includes a second photosensitive submodule and an infrared filter that are integrally formed), a=0, b is determined according to the ambient brightness, c=1.

In case that the filtering and photosensitive module is integrated with the color filtering module and the infrared filter (if the filtering and photosensitive module includes a first portion and a second portion, the first portion includes a third photosensitive submodule and an infrared filter that are integrally formed, and the second portion includes a fourth photosensitive submodule and a color filtering module that are integrally formed), a is determined according to light energy distribution information and color components absorbed by the filtering and photosensitive module, b is determined according to the ambient brightness, c=1.

The determining a according to light energy distribution information and color components absorbed by the filtering and photosensitive module includes: determining a first light energy ratio corresponding to the color components absorbed by the filtering and photosensitive module and a second light energy ratio corresponding to the color component remaining after the absorption by the filtering and photosensitive module according to the light energy distribution information and the color components absorbed by the filtering and photosensitive module; and obtaining a from the ratio of the first light energy ratio to the second light energy ratio.

According to some embodiments of the present disclosure, three examples of the specific position of the filtering and photosensitive module in the camera assembly and corresponding first image data and second image data are given below.

First, the filtering and photosensitive module is disposed between the microlens and the photosensitive module in the camera assembly; the first image data includes luminance data of two color components of red, green and blue color components of visible light that are absorbed by the filtering and photosensitive module; the second image data includes luminance data of a color component of visible light that remains after absorption by the filtering and photosensitive module.

In this example, a specific implementation of embodiments of the present disclosure may include: a conventional photosensitive module of a camera sensor is set to be a photosensitive module A (i.e., the photosensitive module in this embodiment), and the color filtering module is replaced with a transparent photosensitive module B (i.e., the filtering and photosensitive module in this embodiment). The transparent photosensitive module B not only has a color filter function, but also can detect light, so as to directly detect the light passing through the infrared filter. The filtered light is further acquired by the photosensitive module A. Since there are two photosensitive modules, two pieces of data can be acquired at the same time. Data acquired by the photosensitive module A can be used as color data for reproducing image, and data acquired by the photosensitive module B and the photosensitive module A can be used as luminance data for reproducing image. The luminance data makes full use of the light energy transmitted through the camera lens, therefore details are rendered better in low light. In addition, according to the current environment conditions and requirements, the data A and the data B may be combined ($Y=mYA+nYB$), so as to enhance the high-brightness and low-brightness details in a same image of a high variance scene by adjusting the combining coefficients m and n. This solution not only improves the utilization rate of light, but also eliminates the need for another secondary camera.

Figure 6:
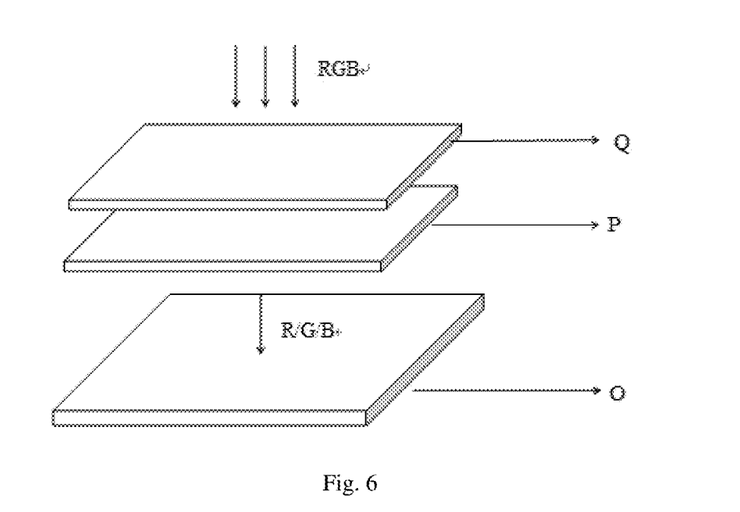
FIG. 6 is a schematic diagram of a position of a filtering and photosensitive module according to some embodiments of the present disclosure.

The optical part of a conventional camera mainly includes the following modules: an aperture and lens module, an infrared filter module (i.e., the infrared filter in this embodiment), a microlens module (i.e., the microlens in this embodiment), a color filtering module, and a photosensitive module. In this embodiment, the conventional color filtering module is replaced with a functional module B capable of both color filtering and light detection (which can be realized by the related art). The color filtering function remains normal, that is, the visible RGB light signal is separated and two components are absorbed. After the filtering, each pixel (pix) receives only one of RGB color components, such as: R; while the light detection function absorbs or is exposed to the other 2 components, such as G and B. The photosensitive module A and the photosensitive module B have the same photosensitive pix resolution, as shown in FIG. 6 (wherein O denotes the photosensitive module A, P denotes the photosensitive module B, and Q denotes the microlens module).

The control module simultaneously activates the photosensitive module A and the photosensitive module B. The two modules operate independently from each other (independently performing light detection and exposure). The visible light is transmitted through the microlens module, and then passes through the color filtering module, namely, the photosensitive module B. The photosensitive module B performs filtering by absorbing two components in the RGB components (which is similar to the related art as far as light filtering is concerned, except that a light detection function is added, that is, an exposure process is implemented to generate image to be used). The photosensitive module A receives a component of the RGB components that remains after filtering of the color filtering module.

The color filtering module, that is, the transparent photosensitive module B, receives light from the microlens. At this time, the light energy is not divided, thus the energy is very strong. Two components in the RGB components lead to an exposure at the transparent photosensitive module B, and the other component in the RGB components that passes through the transparent photosensitive module continues to lead to an exposure at the photosensitive module A at the bottom. For example, for a red R pixel, the photosensitive module A absorbs the R component, and the photosensitive module B absorbs the G and B components; for a green G pixel, the photosensitive module A absorbs the G component, and the photosensitive module B absorbs the R and B components; for a blue B pixel, the photosensitive module A absorbs the B component, and the photosensitive module B absorbs the R and G components.

Figure 7:
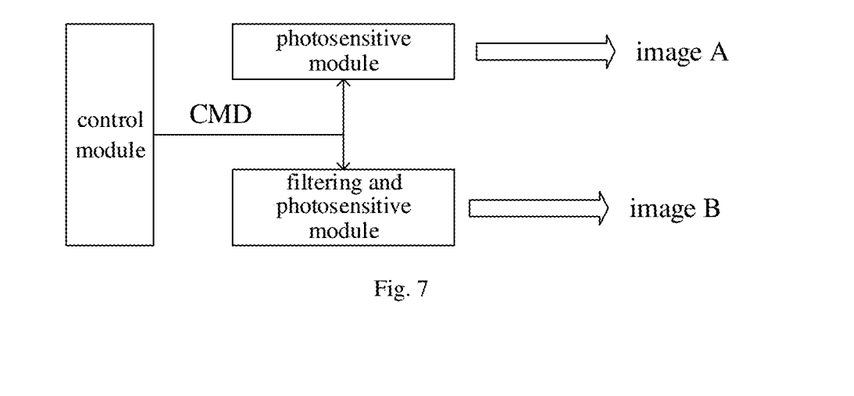
FIG. 7 is a schematic diagram of acquiring first image data and second image data according to some embodiments of the present disclosure.

As shown in FIG. 7, the control module controls the photosensitive module A (i.e., the photosensitive module in FIG. 7) and the photosensitive module B (i.e., the filtering and photosensitive module in FIG. 7) to be exposed simultaneously, and sets a same exposure duration. After exposure of each line, the control module converts the analog photoelectric signals generated by the photosensitive modules A and B into digital signals separately by means of an analog-to-digital converter (ADC), and outputs image A data (i.e., the second image data in this embodiment) and image B data (i.e., the first image data in this embodiment) respectively. Since the photosensitive module A and the photosensitive module B are exposed simultaneously, data derived from exposures at the same time instant are output separately.

A data reception terminal (which may be integrated in the camera or may be another controller) receives the image A data and the image B data, respectively, where each pixel of the image A is an individual component of RGB components, and value of each pixel is used to perform color reproduction; while each pixel of the image B is a combination of two components of RGB components, and thus has a stronger signal, and the image B is used in conjunction with the image A to implement image brightness reproduction. For example, Y=mYA+nYB, m and n are preset values, YA represents luminance information acquired from the image A, and YB represents luminance information acquired from the image B.

In this case, it is possible to output two sets of image data at the same time, or to output one set of image data with a good signal-to-noise ratio. Additionally, the color part and the luminance part are optically separated directly, thereby providing good data support for subsequent image processing, while reducing the computation involved.

Second, the camera assembly further includes a color filtering module configured to absorb two color components of red, green and blue color components of visible light. A microlens in the camera assembly is disposed between the filtering and photosensitive module and the photosensitive module. The first image data includes luminance data of an infrared light component absorbed by the filtering and photosensitive module. The second image data includes luminance data of a color component of visible light that remains after absorption by the color filtering module.

Figure 8:
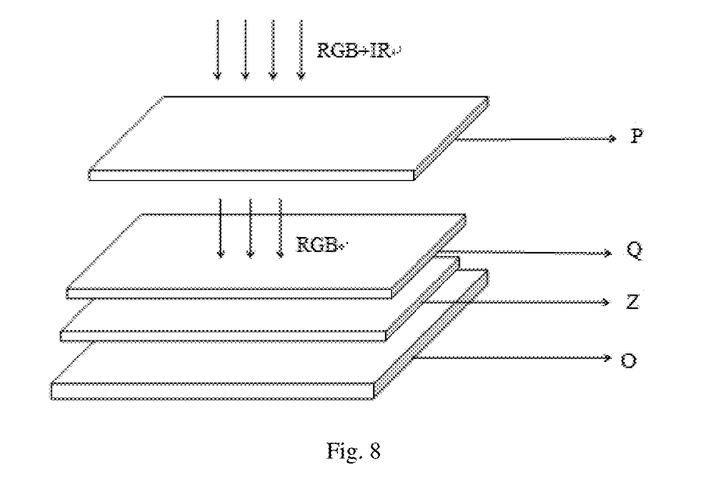
FIG. 8 is another schematic diagram of a position of a filtering and photosensitive module according to some embodiments of the present disclosure.

In this example, a specific implementation of embodiments of the present disclosure may include: unlike the above example, the infrared filtering part of the camera is replaced with another transparent photosensitive module B (i.e., the filtering and photosensitive module in this embodiment), as shown in FIG. 8. The optical part of a conventional camera mainly includes the following modules: an aperture and lens module, an infrared filtering module (i.e., the infrared filter in this embodiment), a microlens module (i.e., the microlens in this embodiment), a color filtering module, and a photosensitive module. The photosensitive module B of the present disclosure is a functional module B capable of both infrared filtering and light detection. The infrared filtering function remains normal, that is, separates and absorbs the infrared light signal in the ambient light. The light energy left after the filtering is mainly composed of visible light, as shown in FIG. 8 (where O denotes the photosensitive module A, P denotes the photosensitive module B, Q denotes the microlens module, and Z denotes the color filtering module).

The control module simultaneously activates the photosensitive module A (i.e., the photosensitive module in this embodiment) and the photosensitive module B. The two modules operate independently from each other. The natural ambient light first passes through the transparent infrared filtering part, that is, the photosensitive module B. The photosensitive module B filters light by absorbing the infrared light component in the natural ambient light. The main light component after passing through the photosensitive module B is visible light component. The photosensitive module A receives the color component of RGB components that remains after passing through the color filtering module.

The light passing through the camera lens lead to an exposure at an IR cult (infrared filter) or a transparent photosensitive module to retain the infrared portion. The infrared filtering module, that is, the transparent photosensitive module B, receives the ambient light transmitted through the lens. At this time, the light energy is not divided, thus the energy is very strong. The transparent photosensitive module B is exposed to or absorbs the infrared light in the ambient light. The light energy that remains after passing through the transparent photosensitive module B is mainly composed of visible light, and then the photosensitive module A at the bottom continues to be exposed.

The control module controls the photosensitive module A and the photosensitive module B to be simultaneously exposed and sets a same exposure duration. After exposure of each line, the control module converts the analog photoelectric signals generated by the photosensitive modules A and B into digital signals separately by means of an analog-to-digital converter (ADC), and outputs image A data (i.e., the second image data in this embodiment) and image B data (i.e., the first image data in this embodiment) respectively. Since the photosensitive module A and the photosensitive module B are exposed simultaneously, data derived from exposures at the same time instant are output separately.

A data reception terminal receives the image A data and the image B data, respectively, where each pixel of the image A is an individual component of RGB components, and value of each pixel is used to perform color reproduction; while each pixel of the image B relates to infrared light energy, and thus has a stronger signal, and the image B is used in conjunction with the image A to implement image brightness reproduction. For example, Y=mYA+nYB, m and n are preset values, YA represents luminance information acquired from the image A, and YB represents luminance information acquired from the image B.

According to some embodiments of the present disclosure, in addition to achieving the effects described in the above example, by replacing the infrared filtering module with the photosensitive module B and using the infrared light to effect an exposure, not only details of image in low light may be enhanced, but also the camera assembly can be used as an infrared camera, a night vision camera, and the like.

According to some embodiments of the present disclosure, the photosensitive module B can be controlled through voltage or the like to realize filtering of different bands or light of specific wavelengths, so as to achieve imaging of certain bands or specific bands for purposes such as iris recognition, laser range-finder (TOF), and the like.

Third, the filtering and photosensitive module includes a first portion and a second portion, a microlens in the camera assembly is disposed between the first portion and the second portion, and the second portion is disposed between the microlens and the photosensitive module in the camera assembly.

The first image data includes first sub-data corresponding to the first portion and second sub-data corresponding to the second portion; the first sub-data includes luminance data of the infrared light component absorbed by the first portion, and the second sub-data includes luminance data of two color components of red, green and blue color components of visible light that are absorbed by the second portion; the second image data includes luminance data of a color component of visible light that remains after absorption by the second portion.

The third example is a combination of the first example and the second example, and details are not described herein.

As can be seen from the above, in the solution provided by embodiments of the present disclosure, brightness reproduction of the target image is performed by using the light energy before light filtering by the color filtering module and/or the infrared filter, and the light energy transmitted through the camera lens can be utilized sufficiently, thus solving the problem in the related art that image quality is impacted by a poor light detection capability of a single camera.

Figure 9:
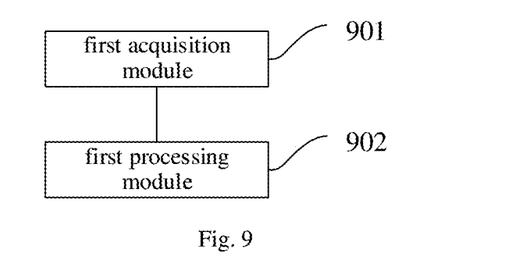
FIG. 9 is a schematic structural diagram of a mobile terminal according to some embodiments of the present disclosure.
Figure 10:
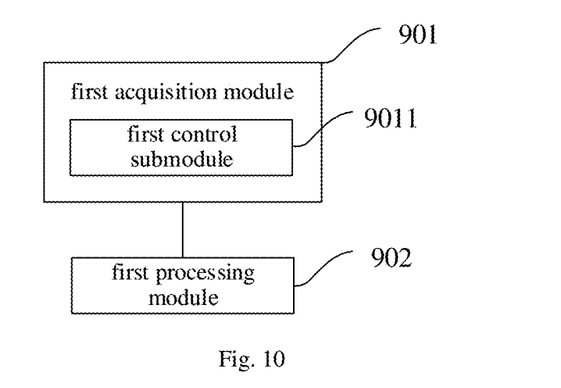
FIG. 10 is another schematic structural diagram of a mobile terminal according to some embodiments of the present disclosure.
Figure 11:
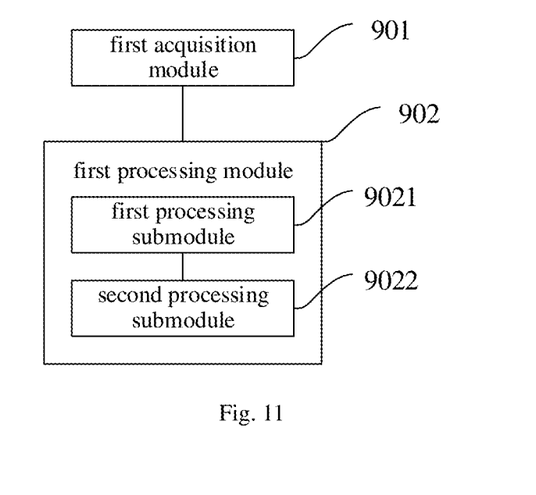
FIG. 11 is yet another schematic structural diagram of a mobile terminal according to some embodiments of the present disclosure.

The present disclosure further provides, in some embodiments, a mobile terminal including the camera assembly described above. As shown in FIG. 9 to FIG. 11, the mobile terminal further includes:

a first acquisition module 901, configured to acquire first image data derived from an exposure of a filtering and photosensitive module in the camera assembly and second image data derived from an exposure of a photosensitive module in the camera assembly;

a first processing module 902, configured to generate a target image based on the first image data and the second image data.

The mobile terminal provided in some embodiments of the present disclosure uses a camera assembly provided with a photosensitive module and a filtering and photosensitive module to acquire first image data derived from an exposure of the filtering and photosensitive module in the camera assembly and second image data derived from an exposure of the photosensitive module in the camera assembly, and generate a target image from the first image data and the second image data, such that the light energy transmitted through the camera lens can be utilized sufficiently, thus solving the problem in the related art that image quality is impacted by a poor light detection capability of a single camera.

As shown in FIG. 10, the first acquisition module 901 includes a first control submodule 9011 configured to control the filtering and photosensitive module and the photosensitive module to be exposed for a first preset duration simultaneously, to obtain the first image data and the second image data, respectively.

Figure 12:
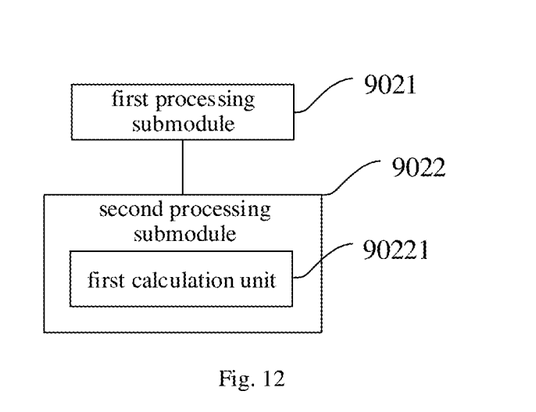
FIG. 12 is still another schematic structural diagram of a mobile terminal according to some embodiments of the present disclosure.

As shown in FIG. 11 and FIG. 12, the first processing module 902 includes: a first processing submodule 9021 configured to perform color reproduction on an image acquired by the camera assembly by using each pixel value in the second image data, to generate an intermediate image; a second processing submodule 9022 configured to perform brightness reproduction on the intermediate image by using the luminance value of each pixel of the first image data and the second image data, to generate a target image.

As shown in FIG. 12, the second processing submodule 9022 includes a first calculation unit 90221 configured to calculate, according to an equation $Y=mYA+nYB$, a luminance value of each pixel of the image acquired by the camera assembly.

Y is a luminance value of a pixel of the image acquired by the camera assembly, YA is a luminance value in the first image data, YB is a luminance value in the second image data, m and n are weight coefficients, and $m>n>0$.

According to some embodiments of the present disclosure, three examples of the specific position of the filtering and photosensitive module in the camera assembly and corresponding first image data and second image data are given below.

First, the filtering and photosensitive module is disposed between the microlens and the photosensitive module in the camera assembly; the first image data includes luminance data of two color components of red, green and blue color components of visible light that are absorbed by the filtering and photosensitive module; the second image data includes luminance data of a color component of visible light that remains after absorption by the filtering and photosensitive module.

Second, the camera assembly further includes a color filtering module configured to absorb two color components of red, green and blue color components of visible light; a microlens in the camera assembly is disposed between the filtering and photosensitive module and the photosensitive module.

The first image data includes luminance data of an infrared light component absorbed by the filtering and photosensitive module; the second image data includes luminance data of a color component of visible light that remains after absorption by the color filtering module.

Third, the filtering and photosensitive module includes a first portion and a second portion, a microlens in the camera assembly is disposed between the first portion and the second portion, and the second portion is disposed between the microlens and the photosensitive module in the camera assembly.

The first image data includes first sub-data corresponding to the first portion and second sub-data corresponding to the second portion; the first sub-data includes luminance data of the infrared light component absorbed by the first portion, and the second sub-data includes luminance data of two color components of red, green and blue color components of visible light that are absorbed by the second portion; the second image data includes luminance data of a color component of visible light that remains after absorption by the second portion.

The mobile terminal provided in the embodiments of the present disclosure is capable of implementing various processes implemented by the mobile terminal in the method embodiments of FIG. 1 to FIG. 8. To avoid repetition, details are not described herein.

As can be seen from the above, the above solution provided by some embodiments of the present disclosure solves the problem in the related art that image quality is impacted by a poor light detection capability of a single camera.

Figure 13:
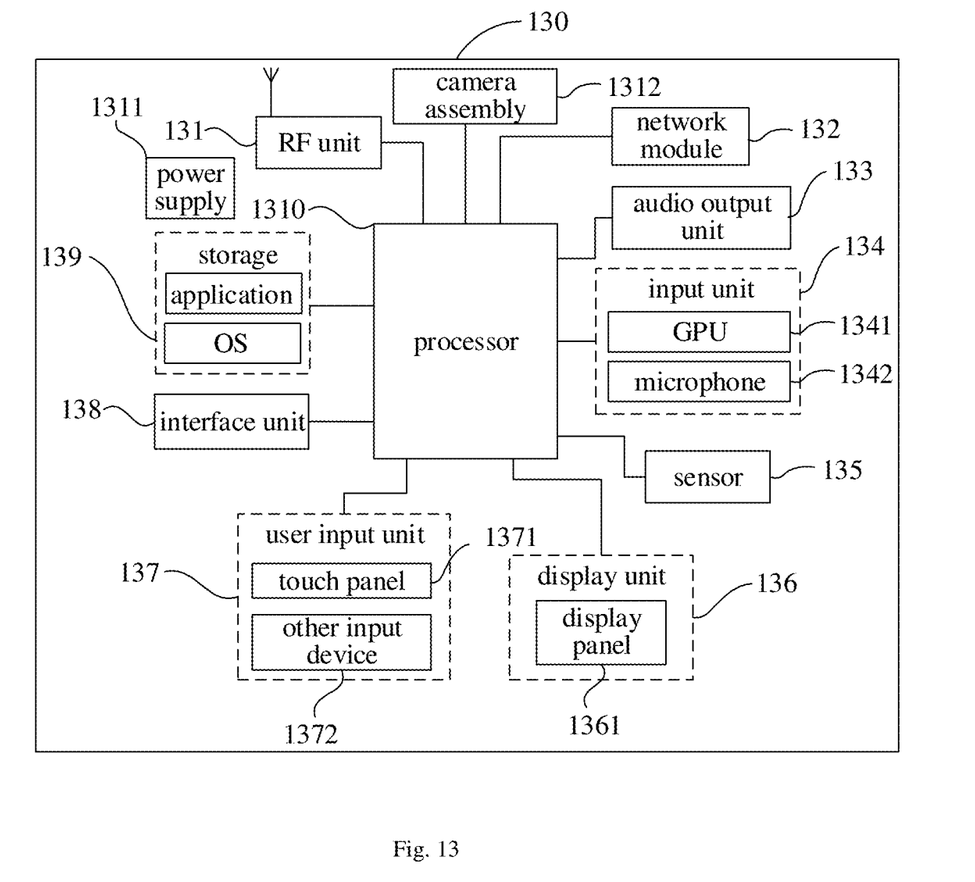
FIG. 13 is still another schematic structural diagram of a mobile terminal according to some embodiments of the present disclosure.

FIG. 13 is a schematic diagram of a hardware structure of a mobile terminal capable of implementing various embodiments of the present disclosure. The mobile terminal 130 includes, but is not limited to: a radio frequency (RF) unit 131, a network module 132, an audio output unit 133, an input unit 134, a sensor 135, a display unit 136, a user input unit 137, an interface unit 138, a storage 139, a processor 1310, a power supply 1311, a camera assembly 1312 and the like. It will be appreciated by those skilled in the art that the mobile terminal structure shown in FIG. 13 does not constitute a limitation on a mobile terminal. The mobile terminal may include more or fewer components than illustrated, or some components may be combined, or different component layouts may be employed. In some embodiments of the present disclosure, the mobile terminal includes, but is not limited to: a mobile phone, a tablet computer, a notebook computer, a palmtop computer, an in-vehicle terminal, a wearable device, a pedometer, and the like.

The mobile terminal 130 includes a camera assembly 1312 including a photosensitive module and a filtering and photosensitive module (for details of structure, refer to the above description). The processor 1310 is configured to acquire first image data derived from an exposure of the filtering and photosensitive module in the camera assembly 1312 and second image data derived from an exposure of the photosensitive module in the camera assembly 1312, and generate a target image from the first image data and the second image data.

In some embodiments of the present disclosure, by arranging the camera assembly provided with a photosensitive module disposed at the bottom and a filtering and photosensitive module disposed in the middle, first image data derived from an exposure of the filtering and photosensitive module in the camera assembly and second image data derived from an exposure of the photosensitive module in the camera assembly are acquired, and a target image is generated from the first image data and the second image data, such that the light energy transmitted through the camera lens can be utilized sufficiently, thus solving the problem in the related art that image quality is impacted by a poor light detection capability of a single camera.

Optionally, the filtering and photosensitive module is disposed between the microlens and the photosensitive module in the camera assembly 1312.

The first image data includes luminance data of two color components of red, green and blue color components of visible light that are absorbed by the filtering and photosensitive module.

The second image data includes luminance data of a color component of visible light that remains after absorption by the filtering and photosensitive module.

Optionally, the camera assembly 1312 further includes a color filtering module configured to absorb two color components of red, green and blue color components of visible light. A microlens in the camera assembly 1312 is disposed between the filtering and photosensitive module and the photosensitive module.

The first image data includes luminance data of an infrared light component absorbed by the filtering and photosensitive module.

The second image data includes luminance data of a color component of visible light that remains after absorption by the color filtering module.

Optionally, the filtering and photosensitive module includes a first portion and a second portion, the microlens in the camera assembly 1312 is disposed between the first portion and the second portion, and the second portion is disposed between the microlens and the photosensitive module in the camera assembly 1312.

The first image data includes first sub-data corresponding to the first portion and second sub-data corresponding to the second portion; the first sub-data includes luminance data of the infrared light component absorbed by the first portion, and the second sub-data includes luminance data of two color components of red, green and blue color components of visible light that are absorbed by the second portion.

The second image data includes luminance data of a color component of visible light that remains after absorption by the second portion.

Optionally, the processor 1310 is specifically configured to control the filtering and photosensitive module and the photosensitive module to be exposed for the first preset duration simultaneously, to obtain the first image data and the second image data, respectively.

Optionally, the processor 1310 is specifically configured to perform color reproduction on the image acquired by the camera assembly 1312 by using each pixel value in the second image data, to generate an intermediate image; and perform brightness reproduction on the intermediate image by using luminance value of each pixel of the first image data and the second image data, to generate a target image.

Optionally, the processor 1310 is specifically configured to calculate, according to the equation $Y=mYA+nYB$, a luminance value of each pixel of the image acquired by the camera assembly 1312.

Y is a luminance value of a pixel of an image acquired by the camera assembly 1312, YA is a luminance value in the first image data, YB is a luminance value in the second image data, m and n are weight coefficients, and $m>n>0$.

It should be understood that, in some embodiments of the present disclosure, the radio frequency unit 131 may be configured to receive and transmit signals during transmission and reception of information or a call. Specifically, after receiving downlink data from a base station, the radio frequency unit 131 sends the downlink data to the processor 1310 for processing. Further, the radio frequency unit 131 transmits uplink data to the base station. Generally, the radio frequency unit 131 includes, but is not limited to: an antenna, at least one amplifier, a transceiver, a coupler, a low noise amplifier, a duplexer, and the like. In addition, the radio frequency unit 131 may also communicate with the network and other devices through a wireless communication system.

The mobile terminal provides a user with wireless broadband Internet access through the network module 132, for example, to enable the user to receive and send emails, browse web pages, access streaming media, and the like.

The audio output unit 133 may convert audio data received by the radio frequency unit 131 or the network module 132 or stored in the storage 139 into an audio signal and output the audio signal as sound. Moreover, the audio output unit 133 can also provide audio output associated with a specific function performed by the mobile terminal 130 (for example, incoming call ringtone, message received ringtone and the like). The audio output unit 133 includes a speaker, a buzzer, a receiver, and the like.

The input unit 134 is configured to receive an audio or video signal. The input unit 134 may include a graphics processing unit (GPU) 1341 and a microphone 1342, and the GPU 1341 processes image data of a still picture or video obtained by an image capturing device (such as a camera) in a video capturing mode or an image capturing mode. Processed image frames can be displayed on the display unit 136. The image frames processed by the GPU 1341 may be stored in the storage 139 (or other storage medium) or transmitted via the radio frequency unit 131 or the network module 132. The microphone 1342 can receive sound and can process such sound into audio data. In a telephone call mode, the processed audio data can be converted into an output format that can be transmitted to a mobile communication base station via the radio frequency unit 131.

The mobile terminal 130 further includes at least one sensor 135 such as a light sensor, a motion sensor, and other sensors. Specifically, the light sensor includes an ambient light sensor and a proximity sensor. The ambient light sensor can adjust the brightness of the display panel 1361 according to the intensity of the ambient light, and the proximity sensor can turn off the display panel 1361 and/or backlight when the mobile terminal 130 is moved near the ear. As a kind of motion sensor, an accelerometer sensor can detect the magnitude of acceleration in various directions (usually three axes). When the accelerometer sensor is stationary, the accelerometer sensor can detect the magnitude and direction of gravity. The accelerometer sensor can be used in posture identification of the mobile terminal (e.g., switch between portrait and landscape modes, related games, magnetometer posture calibration), vibration identification related function (such as pedometer, tapping), and the like. The sensor 135 may further include a fingerprint sensor, a pressure sensor, an iris sensor, a molecular sensor, a gyroscope, a barometer, a hygrometer, a thermometer, an infrared sensor, and the like. Details are not described herein.

The display unit 136 is configured to display information input by the user or information provided to the user. The display unit 136 may include a display panel 1361. The display panel 1361 may be configured in the form of a liquid-crystal display (LCD), an organic light-emitting diode (OLED) or the like.

The user input unit 137 may be configured to receive input numeric or character information and to generate key signal inputs related to user settings and functional control of the mobile terminal. Specifically, the user input unit 137 includes a touch panel 1371 and other input devices 1372. The touch panel 1371, also referred to as a touch screen, can collect a touch operation (for example, an operation performed by the user on the touch panel 1371 or near the touch panel 1371 using a finger, a stylus or any appropriate object or accessory) of the user on or near the touch panel 1371. The touch panel 1371 may include two parts, namely, a touch detection device and a touch controller. The touch detection device detects the position touched by the user, detects a signal as a result of the touch operation, and transmits the signal to the touch controller. The touch controller receives touch information from the touch detection device, converts the touch information into contact coordinates, and sends the contact coordinates to the processor 1310. The touch controller receives commands from the processor 1310 and executes the commands In addition, the touch panel 1371 may be implemented in various forms such as resistive, capacitive, infrared, or surface acoustic wave touch panel. In addition to the touch panel 1371, the user input unit 137 may further include other input devices 1372. Specifically, other input devices 1372 may include, but are not limited to, a physical keyboard, functional keys (for example, a volume control button, and a switch button), a trackball, a mouse, and a joystick. Details are not described herein.

Optionally, the touch panel 1371 may be overlaid on the display panel 1361. When the touch panel 1371 detects a touch operation on or near the touch panel 1371, the touch panel 1371 transmits the detected signal to the processor 1310 to determine the type of the touch event. The processor 1310 then provides a corresponding visual output on the display panel 1361 according to the type of the touch event. Although in FIG. 13, the touch panel 1371 and the display panel 1361 are implemented as two independent components to achieve the input and output functions of the mobile terminal, the touch panel 1371 and the display panel 1361 may be integrated to achieve the input and output functions of the mobile terminal in some embodiments, which is not limited herein.

The interface unit 138 is an interface by which an external device is connected to the mobile terminal 130. For example, the external device may include a wired or wireless headset port, an external power (or battery charger) port, a wired or wireless data port, a memory card port, a port for connecting a device having an identification module, an audio input/output (I/O) port, a video I/O port, a headphone port, and the like. The interface unit 138 may be configured to receive input (for example, data information, power and the like) from the external device and transmit the received input to one or more components within the mobile terminal 130 or may be configured to transfer data between the mobile terminal 130 and the external device.

The storage 139 may be configured to store software programs as well as various data. The storage 139 may mainly include a program storage area and a data storage area. The program storage area may store an operating system, an application required for at least one function (for example, a sound playback function, and an image displaying function), and the like. The data storage area may store data (for example, audio data, a phone book and the like) created according to the usage of a mobile phone. Moreover, the storage 139 may include a high-speed random access memory (RAM), and may further include a non-volatile storage, for example, at least one magnetic disk storage device and flash memory device, or other volatile solid state storage device.

The processor 1310 is a control center of the mobile terminal, is connected to various portions of the entire mobile terminal using various interfaces and lines, and performs various functions of the mobile terminal and processes data by running or executing software programs and/or modules stored in the storage 139 and invoking data stored in the storage 139, so as to monitor the mobile terminal as a whole. The processor 1310 may include one or more processing units. Optionally, the processor 1310 may integrate an application processor and a modem. The application processor mainly processes an operating system, a user interface, an application, and the like. The modem mainly processes wireless communication. It may be understood that the modem may not be integrated into the processor 1310.

The mobile terminal 130 may further include a power supply 1311 (for example, a battery) for powering various components. Optionally, the power supply 1311 may be logically coupled to the processor 1310 through a power management system, so as to implement charging management, discharging management, power consumption management, and other functions through the power management system.

In addition, the mobile terminal 130 includes some functional modules not shown, which are not described herein.

Optionally, the present disclosure further provides, in some embodiments, a mobile terminal, including a processor 1310, a storage 139, and a computer program stored in the storage 139 and configured to be executed by the processor 1310. The processor 1310 is configured to execute the computer program to implement various processes of the embodiments of the image acquisition method, and the same technical effect may be achieved. To avoid repetition, details are not described herein.

The present disclosure further provides, in some embodiments, a computer readable storage medium storing therein a computer program. The computer program is configured to be executed by a processor to implement various processes of the embodiments of the image acquisition method embodiment, and the same technical effect may be achieved. To avoid repetition, details are not described herein. The computer-readable storage medium includes a read-only memory (ROM), a random access memory (RAM), a magnetic disk, an optical disc, or the like.

It should be noted that the terms "include", "have", or any variation thereof used herein are intended to cover a non-exclusive inclusion, such that a process, a method, an article, or a device that includes a list of elements not only includes the list of elements, but also may include other elements not expressly listed or include elements inherent to the process, the method, the article, or the device. In case that there is no further limitation, an element preceded by "includes or including" does not preclude existence of additional identical elements in the process, the method, the article, or the device including the element.

From the foregoing description of the embodiments, a person skilled in the art will clearly appreciate that the method according to the embodiments may be implemented not only by software in conjunction with necessary generic hardware platform, but also by hardware, although the former will be preferred in most cases. Based on such an understanding, essential parts, or parts contributing to the related art, of the technical solution of the present disclosure may be implemented in form of a software product. The software product is stored in a storage medium (e.g., an ROM/RAM, a magnetic disk and an optical disc) and includes several instructions configured to be executed by UE (such as a handset, a computer, a server, an air conditioner or a network device) to perform the method according to the embodiments of the present disclosure.

The embodiments of the present disclosure are described above with reference to the accompanying drawings. However, the present disclosure is not limited to the foregoing specific implementations. The foregoing specific implementations are merely illustrative rather than limitative. In light of the teachings of the present disclosure, a person of ordinary skill in the art may further make various forms without departing from the spirit of the present disclosure and the scope of the claims, and these forms all fall within the scope of the present disclosure.

What is claimed is:

1. A camera assembly comprising a photosensitive module, wherein the camera assembly further comprises a filtering and photosensitive module, the photosensitive module is disposed at bottom of the camera assembly, and the filtering and photosensitive module is disposed in middle of the camera assembly;
    wherein incident light transmitted into the camera assembly first passes through the filtering and photosensitive module and then through the photosensitive module;
    wherein the camera assembly further comprises a microlens;
    the microlens is disposed between the filtering and photosensitive module and the photosensitive module, and the filtering and photosensitive module comprises a second photosensitive submodule and an infrared filter that are integrally formed; or,
    the filtering and photosensitive module comprises a first portion and a second portion, the microlens is disposed between the first portion and the second portion, the second portion is disposed between the microlens and the photosensitive module, the first portion comprises a third photosensitive submodule and an infrared filter that are integrally formed, and the second portion comprises a fourth photosensitive submodule and a color filtering module that are integrally formed.

2. An image acquisition method applied to a mobile terminal comprising the camera assembly according to claim 1, wherein the image acquisition method comprises:
    acquiring first image data derived from an exposure of a filtering and photosensitive module in the camera assembly and second image data derived from an exposure of a photosensitive module in the camera assembly;
    generating a target image from the first image data and the second image data.

3. The image acquisition method according to claim 2, wherein the camera assembly further comprises a color filtering module configured to absorb two color components of red, green and blue color components of visible light; in case that the microlens in the camera assembly is disposed between the filtering and photosensitive module and the photosensitive module,
    the first image data comprises luminance data of an infrared light component absorbed by the filtering and photosensitive module,
    the second image data comprises luminance data of a color component of visible light that remains after absorption by the color filtering module.

4. The image acquisition method according to claim 2, wherein in case that the filtering and photosensitive module comprises the first portion and the second portion, the microlens in the camera assembly is disposed between the first portion and the second portion, and the second portion is disposed between the microlens and the photosensitive module in the camera assembly,
    the first image data comprises first sub-data corresponding to the first portion and second sub-data corresponding to the second portion; the first sub-data comprises luminance data of an infrared light component absorbed by the first portion, and the second sub-data comprises luminance data of two color components of red, green and blue color components of visible light that are absorbed by the second portion,
    the second image data comprises luminance data of a color component of visible light that remains after absorption by the second portion.

5. The image acquisition method according to claim 2, wherein the acquiring the first image data derived from an exposure of the filtering and photosensitive module in the camera assembly and the second image data derived from an exposure of the photosensitive module in the camera assembly comprises:

controlling the filtering and photosensitive module and the photosensitive module to be exposed for a first preset duration simultaneously to obtain the first image data and the second image data, respectively.

6. The image acquisition method according to claim 2, wherein the generating a target image from the first image data and the second image data comprises:

performing color reproduction on an image acquired by the camera assembly by using each pixel value in the second image data, to generate an intermediate image;

performing brightness reproduction on the intermediate image by using a luminance value of each pixel in the first image data and the second image data, to generate the target image.

7. The image acquisition method according to claim 6, wherein the performing brightness reproduction on the intermediate image by using a luminance value of each pixel in the first image data and the second image data comprises:

calculating, according to an equation $Y=mYA+nYB$, a luminance value of each pixel of the image acquired by the camera assembly;

wherein, Y is a luminance value of a pixel of the image acquired by the camera assembly, YA is a luminance value in the first image data, YB is a luminance value in the second image data, m and n are weight coefficients, and $m>n>0$.

8. A non-transitory computer readable storage medium storing therein a computer program, wherein the computer program is configured to be executed by a processor, to implement steps of the image acquisition method according to claim 2.

9. A mobile terminal, comprising the camera assembly according to claim 1, and further comprising a processor, a storage, and a computer program stored in the storage and configured to be executed by the processor, wherein the processor is configured to execute the computer program, to implement following steps:

acquiring first image data derived from an exposure of a filtering and photosensitive module in the camera assembly and second image data derived from an exposure of a photosensitive module in the camera assembly;

generating a target image from the first image data and the second image data.

10. The mobile terminal according to claim 9, wherein the camera assembly further comprises a color filtering module configured to absorb two color components of red, green and blue color components of visible light; in case that the microlens in the camera assembly is disposed between the filtering and photosensitive module and the photosensitive module, the first image data comprises luminance data of an infrared light component absorbed by the filtering and photosensitive module, the second image data comprises luminance data of a color component of visible light that remains after absorption by the color filtering module.

11. The mobile terminal according to claim 9, wherein in case that the filtering and photosensitive module comprises the first portion and the second portion, the microlens in the camera assembly is disposed between the first portion and the second portion, and the second portion is disposed between the microlens and the photosensitive module in the camera assembly, the first image data comprises first sub-data corresponding to the first portion and second sub-data corresponding to the second portion; the first sub-data comprises luminance data of an infrared light component absorbed by the first portion, and the second sub-data comprises luminance data of two color components of red, green and blue color components of visible light that are absorbed by the second portion, the second image data comprises luminance data of a color component of visible light that remains after absorption by the second portion.

12. The mobile terminal according to claim 9, wherein the processor is further configured to execute the computer program to implement following step:

controlling the filtering and photosensitive module and the photosensitive module to be exposed for a first preset duration simultaneously to obtain the first image data and the second image data, respectively.

13. The mobile terminal according to claim 9, wherein the processor is further configured to execute the computer program to implement following steps:

performing color reproduction on an image acquired by the camera assembly by using each pixel value in the second image data, to generate an intermediate image;

performing brightness reproduction on the intermediate image by using a luminance value of each pixel in the first image data and the second image data, to generate the target image.

14. The mobile terminal according to claim 13, wherein the processor is further configured to execute the computer program to implement following step:

calculating, according to an equation $Y=mYA+nYB$, a luminance value of each pixel of the image acquired by the camera assembly;

wherein, Y is a luminance value of a pixel of the image acquired by the camera assembly, YA is a luminance value in the first image data, YB is a luminance value in the second image data, m and n are weight coefficients, and $m>n>0$.

* * * * *